Dec. 29, 1964  M. J. BIRD  3,163,465
CYCLE SADDLE
Filed June 20, 1963
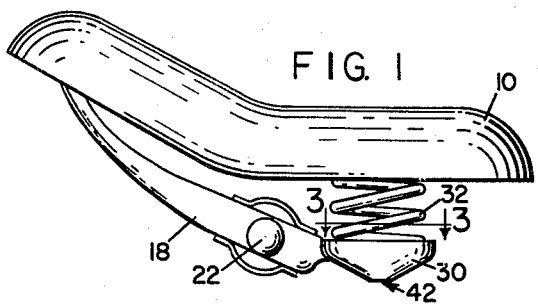
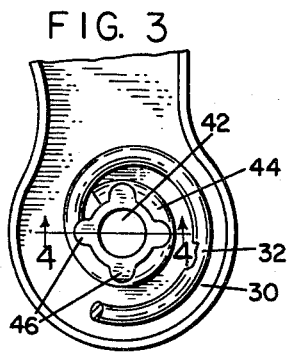
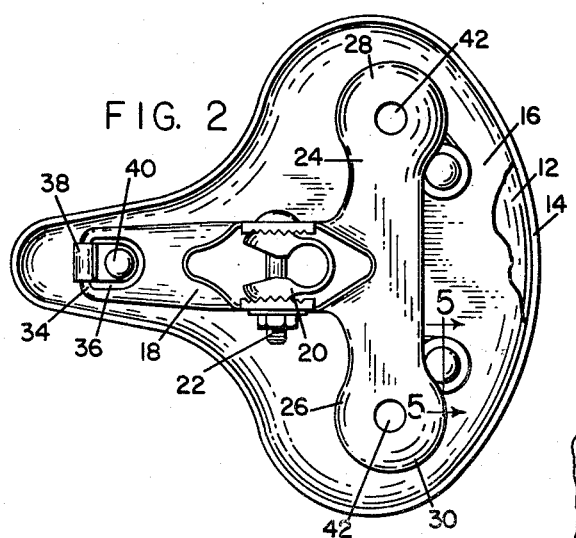
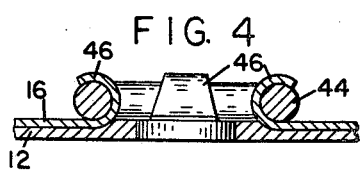
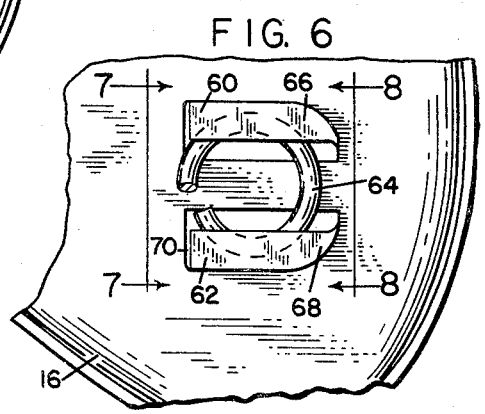
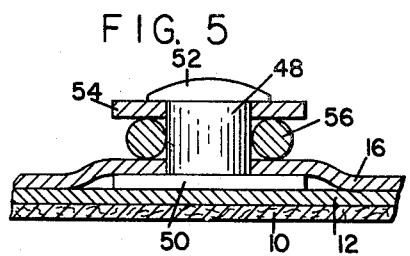
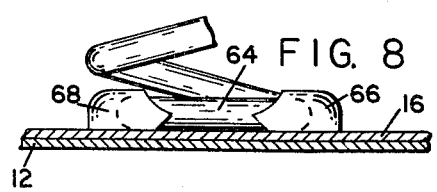
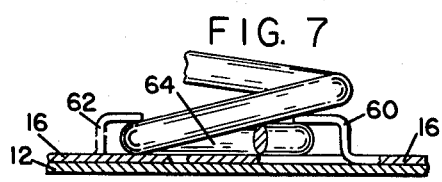
INVENTOR
MARTIN J. BIRD
BY *Charles R. Fay*
ATTORNEY

United States Patent Office 3,163,465
Patented Dec. 29, 1964

3,163,465
CYCLE SADDLE
Martin J. Bird, Norwalk, Ohio, assignor to The Faulhaber Company, Monroeville, Ohio, a corporation of Ohio
Filed June 20, 1963, Ser. No. 289,217
3 Claims. (Cl. 297—209)

This invention relates to cycle saddles for bicycles, motorcycles, or tricycles, and the principal object of the invention resides in improving the quality of the saddle while at the same time reducing the manufacturing cost and simplifying the construction.

One of the objects of the invention includes providing the cycle saddle rear spring cup construction in a simpler and less expensive manner while at the same time more positively securing the rear springs to the cups by punching a central hole in the bottom of each cup and turning up tabs formed of the cup material so punched, and clinching the same over the end coil portion of the spring, thus forming a plurality of independent holding members directly from the material of the cup and securing the spring thereto in an efficient and long-lasting shakeproof manner.

Another object of the invention resides in securing the rear saddle springs to the under side of the saddle by the provision of new and improved and less expensive means including headed rivets, the headed rivets being interposed between the two plates forming the general outline of the cycle saddle, each rivet having a shank member extending through the lower plate, through an eye at the opposite end of the saddle spring from the cup, and terminating in another head including a washer member holding the parts permanently in position and avoiding the usual vibration loss when the conventional screw-threaded members are utilized.

A further object of the invention resides in the provision of a similar rivet construction at the pommel, and securing the forward nose piece of the reach member to the cycle saddle by a similar rivet construction.

Another object of the invention resides in the provision of the combination of the cup-securing means at one end of each saddle spring in combination with a crimped spring connection with respect to the saddle seat at the opposite end thereof, said crimped construction comprising the provision of a pair of slots in the lower plate of the saddle, said slots forming raised lips formed to provide for the entry of the end coil of the spring in one direction only therein, said raised lips being crimped upon the coil of the spring in order to permanently hold the parts in position in the absence of the use of rivets, bolts, nuts or any other fasteners.

Other objects and advantages of the invention will appear hereinafter.

Reference is to be had to the accompanying drawings, in which:

FIG. 1 is a view in side elevation of the new saddle;
FIG. 2 is a bottom plan view thereof;
FIG. 3 is an enlarged section on line 3—3 of FIG. 1;
FIG. 4 is a further enlarged section on line 4—4 of FIG. 3;
FIG. 5 is an enlarged section on line 5—5 of FIG. 2;
FIG. 6 is a bottom plan view of a modified construction, parts being broken away and in section, and
FIGS. 7 and 8 are enlarged sectional views on the corresponding lines in FIG. 6.

In carrying out the present invention, the saddle under consideration is of more or less the usual type insofar as the covering material 10 is concerned and the fact that the edges of this covering material are extended over the edge of an inner plate 12, the outer or lower plate 16 being secured thereto by well known means in such a way as to clamp the edge material of the cycle saddle at 14 in position. This construction provides two steel saddle-shaped plates to which the under frame is connected by means to be described.

The under frame comprises the usual reach parts at 18, these including the usual clamp 20 and bolt 22, these being mounted on the reach 18. The rear portion of the reach member extends laterally as at 24, 26 forming the two cups 28 and 30. Each cup receives a coil spring 32, one end of each coil spring 32 being secured to plate 16 and the other end being secured to the cup.

The forward portion of the reach terminates in a transverse bridge portion 34 occasioned by an opening 36, and this bridge portion 34 is provided with a generally U-shaped clip 38 which is bent over the transverse bridge 34 forming two flat contacting legs which are riveted to plate 16 by a construction to be described, but including a rivet having a head 40. As seen in FIG. 2, each cup has a central hole at 42 in the bottom thereof.

Referring now to FIGS. 3 and 4, the end coil of spring 32 is indicated at 44. The hole at 42 in the cup 30 as well as the other cup 28 is not formed by removing material but by punching the hole and forcing it to break into a plurality of tabs 46 which are crimped over the coil 44, clamping the entire coil tightly to the cup at the inside. This construction firmly holds the spring in the position shown in FIG. 3 and it will be seen that a plurality of holding members 46 are provided rather than a single fastener as in the prior art, and this provides not only a cheaper but a better holding construction.

At the opposite end of the spring it is connected to the plate 16 by a headed rivet 48 having a portion 50 underlying plate 16, a shank which extends through a hole in plate 16 and a head 52 which overlies a washer 54 and is tightly secured to a final coil 56 of spring 32 adjacent to the saddle construction. This rivet construction is inexpensive and simple and it completely avoids the deficiency in the prior art of the use of screw-threaded studs which eventually shake loose regardless of the use of lock washers, etc. This same construction is utilized at 40 to secure the forward portion of the reach to plate 16 and it is also utilized as to the other spring for cup 28.

Instead of this rivet construction, however, plate 16 may have struck up therefrom a pair of generally parallel elongated lips 60, 62 which slidingly receive an enlarged final coil 64 of a spring similar to those at 32. The lips may be made in such a shape as to form stops at 66, 68 so that the coil 64 of the spring is enterable only from the forward portion 70 of this particular construction, but once seated against the stop members 66 and 68 the lips 60, 62 are crimped down to permanently hold the coil of the spring in position, this being particularly well shown in FIGS. 7 and 8.

Having thus described my invention and the advantages thereof, I do not wish to be limited to the details herein disclosed, otherwise than as set forth in the claims, but what I claim is:

1. A cycle saddle including a saddle plate, a reach member thereon formed in substantially T-shape, having a forwardly extending portion clamped to said saddle plate and laterally extending rear portions having integral spring receiving cups formed at the outer ends thereof, coil springs extending from the cups to the plate, and means securing an end coil of each spring to a cup, said means comprising a plurality of tabs within each cup, said tabs being struck up from a central location in the bottom of each cup, said tabs extending outwardly away from each other in a general radial direction relative to its cup and the end coil of the responsive spring, and each tab embracing the end coil, the latter surrounding portions of the tabs, and means securing the other end coil of each spring to the plate.

2. The cycle saddle of claim 1 wherein the last-named means comprises a pair of separate spaced parallel members struck from said saddle plate, a lip on each said member, said lips extending toward each other, said members and lips together forming a channel slidably receiving the other end coil, and means positioning the latter in the channel.

3. The cycle saddle of claim 1 wherein the last-named means comprises a pair of spaced parallel angular members on the plate, said angular members forming a channel slidably receiving the other end coil, and means positioning the latter in the channel, the positioning means comprising non-parallel portions of the angular members extending toward each other.

References Cited by the Examiner

UNITED STATES PATENTS

| 103,778 | 5/70 | Rhinelander | 267—4 |
| 362,174 | 5/87 | Palmatier | 267—6 |
| 1,924,973 | 8/33 | Beede et al. | 267—6 |
| 2,096,624 | 10/37 | Anderson | 297—212 X |
| 2,316,436 | 4/43 | Kalter | 297—209 |
| 2,669,283 | 2/54 | Faulhaber | 297—209 |
| 2,884,045 | 4/59 | Walsh | 297—209 |

FRANK B. SHERRY, *Primary Examiner.*